(12) United States Patent
Kubler et al.

(10) Patent No.: US 6,588,999 B2
(45) Date of Patent: *Jul. 8, 2003

(54) SEALABLE FASTENER WITH SEALANT DELIVERY PASSAGEWAY TO CIRCUMFERENTIAL SEALANT CHANNEL

(76) Inventors: Frank L. Kubler, 13261 SW. 54th Ct., Miramar, FL (US) 33027; Andrew L. Ducker, III, 9604 NW. 28th St., Coral Springs, FL (US) 33065

( * ) Notice: Subject to any disclaimer, the term of this patent is extended or adjusted under 35 U.S.C. 154(b) by 0 days.

This patent is subject to a terminal disclaimer.

(21) Appl. No.: 10/084,288

(22) Filed: Feb. 27, 2002

(65) Prior Publication Data

US 2003/0035697 A1 Feb. 20, 2003

Related U.S. Application Data

(63) Continuation-in-part of application No. 09/931,697, filed on Aug. 15, 2001, now abandoned, and a continuation-in-part of application No. 09/982,400, filed on Oct. 18, 2001.

(51) Int. Cl.[7] ............................................... F16B 39/02
(52) U.S. Cl. ..................... 411/82.1; 411/258; 411/417; 411/395
(58) Field of Search .......................... 411/82–82.3, 258, 411/930, 417, 304, 411–413, 395, 371.1, 542

(56) References Cited

U.S. PATENT DOCUMENTS

| 2,398,838 | A | * | 4/1946 | Miller |
| 2,550,357 | A | * | 3/1951 | Jansen |
| 3,434,743 | A | * | 3/1969 | Boeker |
| 4,063,582 | A | * | 12/1977 | Fischer |
| 4,945,625 | A | * | 8/1990 | Winston |
| 5,494,391 | A | * | 2/1996 | Zhou |

* cited by examiner

*Primary Examiner*—Flemming Saether
(74) *Attorney, Agent, or Firm*—Frank L. Kubler

(57) ABSTRACT

A sealable fastener for insertion into a fastener opening bore in a receiving structure includes a fastener shank including a shank first end having a shank first end wall and a shank second end having a shank second end wall, a shank side wall extend between the shank first end wall and the shank second end wall and a circumferential channel recessed into the shank side wall; and a sealant delivery passageway having a passageway entry port in the shank first end and extending to a passageway exit port opening into the circumferential channel; so that a flowable sealant injected into the passageway entry port flows through the sealant delivery passageway and exits through the passageway exit port and flows into and around the circumferential channel, creating a circumferential seal between the fastener shank and the fastener opening in the receiving structure.

22 Claims, 10 Drawing Sheets

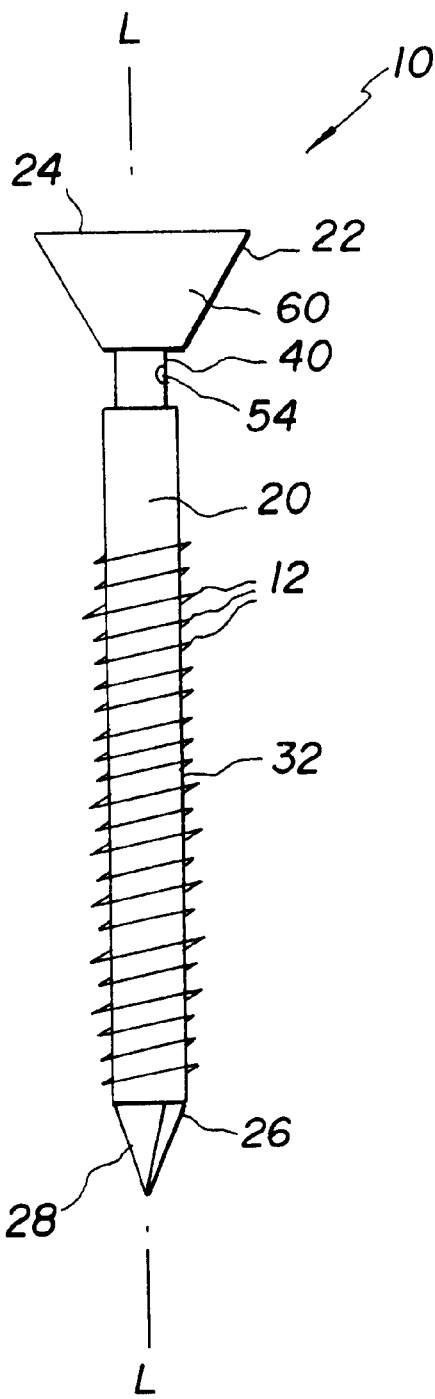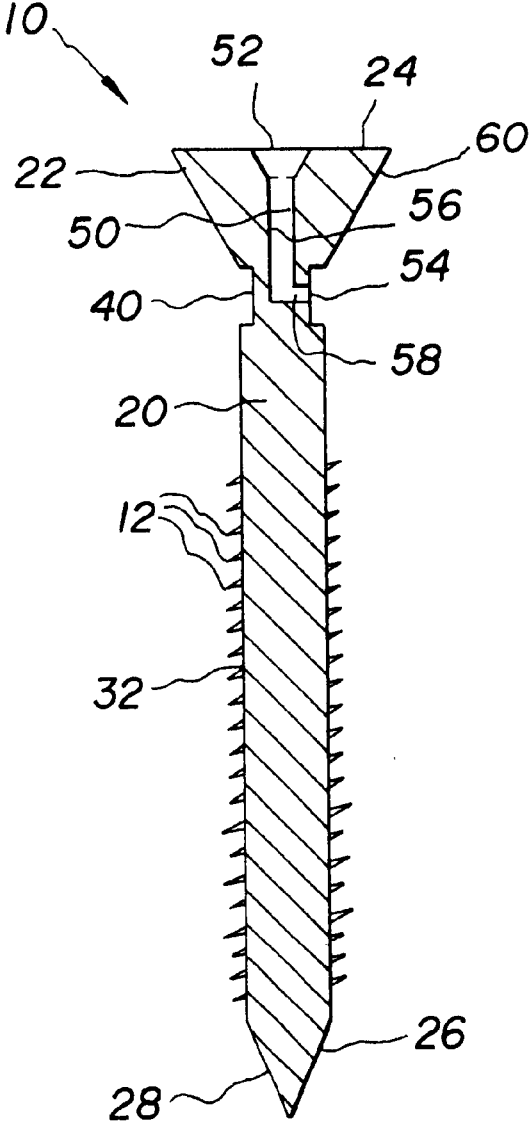
FIG. 1
FIG. 2

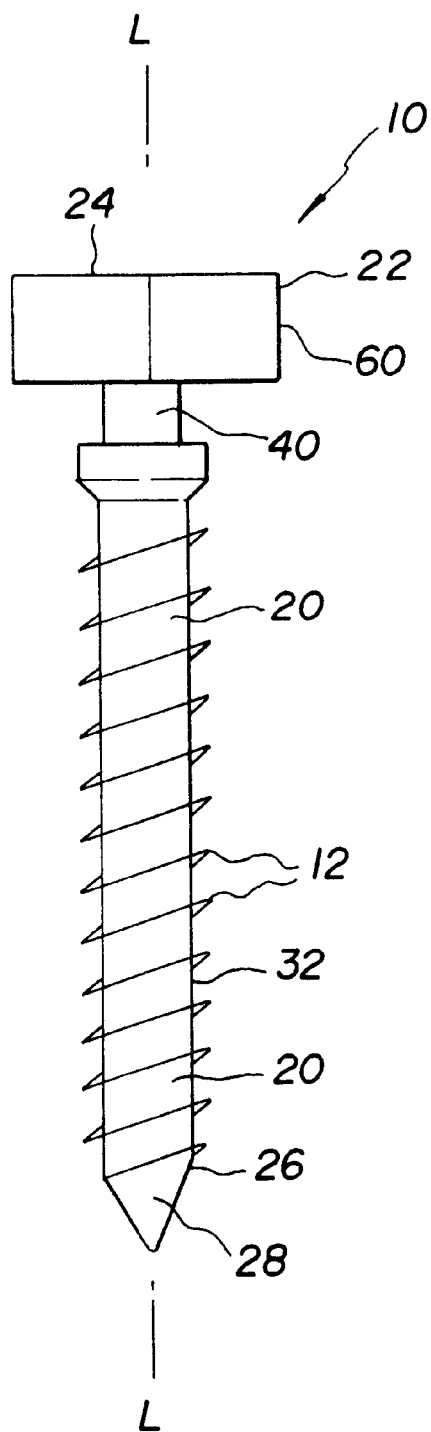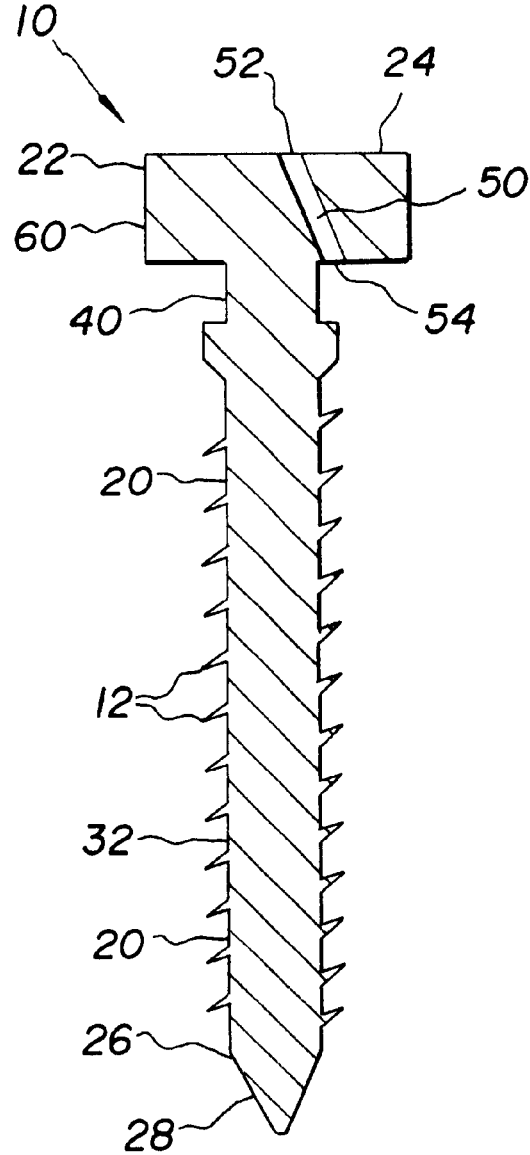
FIG. 9
FIG. 10

FIG. 16
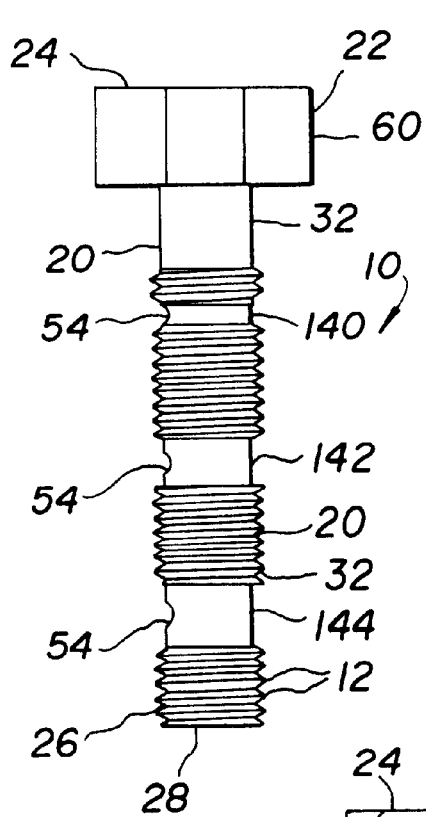
FIG. 17
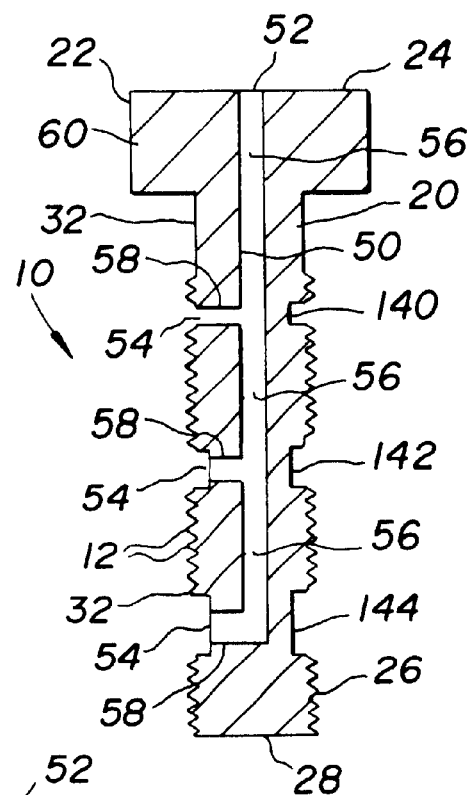
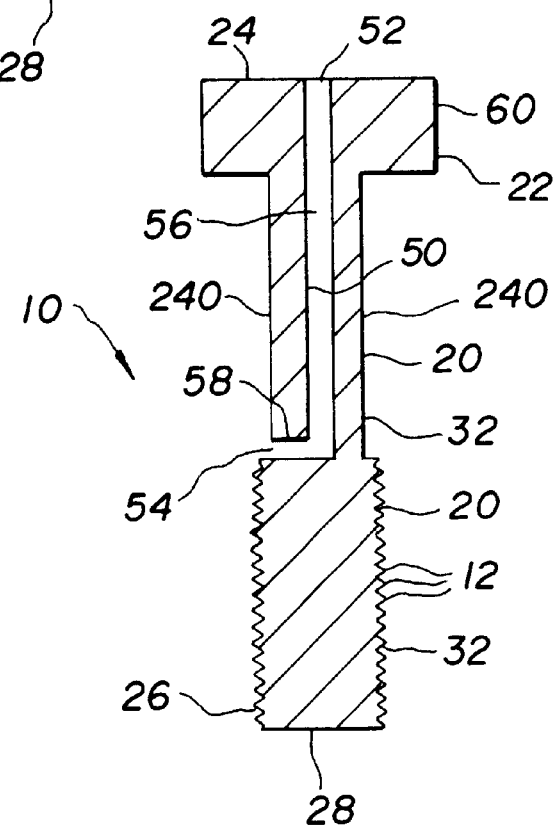
FIG. 18

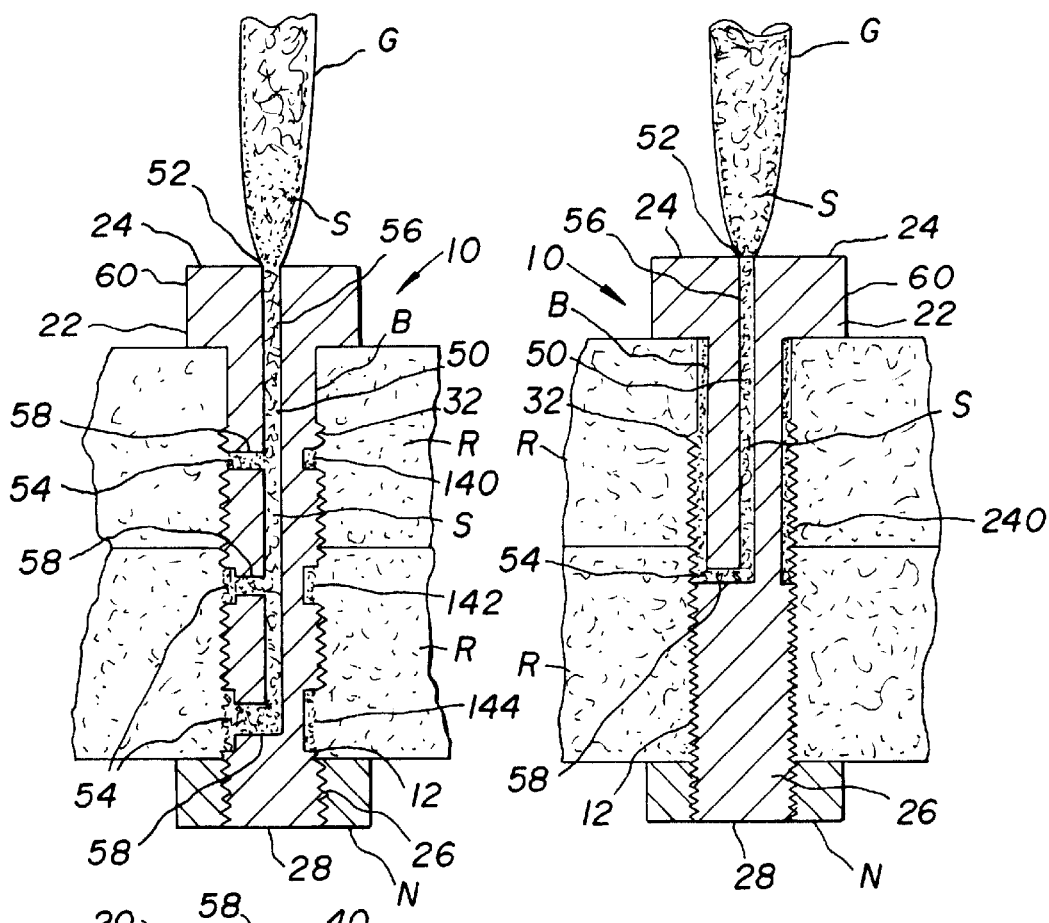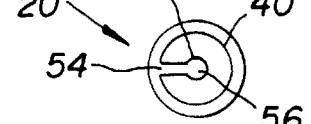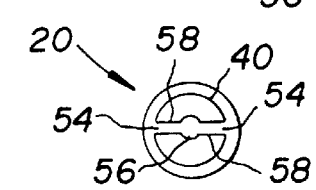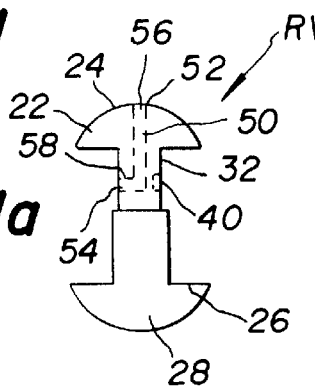

SEALABLE FASTENER WITH SEALANT DELIVERY PASSAGEWAY TO CIRCUMFERENTIAL SEALANT CHANNEL

FILING HISTORY

This application is a based in part upon the disclosure contained within disclosure document number 495,287 filed on Jun. 13, 2001, and a continuation-in-part of application Ser. No. 09/931,697, filed on Aug. 15, 2001 now abandoned, and a continuation-in-part of application Ser. No. 09/982,400 filed on Oct. 18, 2001.

BACKGROUND OF THE INVENTION

1. Field of the Invention

The present invention relates generally to the field of fasteners, particularly in the marine and construction industries, including screws, such as those used to construct boat hulls, bolts, such as concrete anchor bolts, and including rivets, nails and pins. More specifically the present invention relates to a sealable fastener including a fastener shank having shank first and second ends with shank first and second end walls, a longitudinal shank side wall and a continuous, fully circumferential channel recessed into the shank side wall, and including a sealant delivery passageway having a passageway entry port in the shank first end and extending both longitudinally and laterally to a passageway exit port opening into the circumferential channel. The sealant delivery passageway may be a bore in the shank extending substantially coaxially with or substantially parallel to the shank longitudinal axis, or may be a combination of fastener head bore through the fastener head and a groove in the shank side wall extending substantially parallel to the shank longitudinal axis. When the fastener is to be used, the fastener shank is inserted into a fastener bore in a receiving structure such as a boat hull or a nut, and then a flowable sealant is injected into the entry port so that the sealant flows through the sealant delivery passageway and exits through the exit port and flows into and around the circumferential channel, creating a circumferential seal between the fastener shank and the receiving structure so that water or other liquid cannot flow around the fastener shank and through the receiving structure. Several circumferential channels interconnected by segments of the sealant delivery passageway may be provided on a fastener for further enhanced sealing. This sealable fastener is intended primarily for the marine and construction industries, but many other home and industrial applications are contemplated.

2. Description of the Prior Art

There have long been fasteners having fastener shanks for extending through and interconnecting multiple discrete fastener receiving structures. These prior fasteners have included bolts, screws, rivets, pins and nails. A problem with these prior fasteners has been that no truly effective means has been provided for creating a seal between the shank of the fastener and the surrounding receiving structure to reliably prevent liquid from flowing along the shank from one side of the receiving structure to the other. This problem is particularly noteworthy in the marine industry and is probably the most common cause of leakage in boat hulls, and is also noteworthy in the construction industry in leakage at roof fasteners and in concrete anchor bolts and in industry in general such as in flange bolts at high pressure pipe joints and on vacuum vessels.

It is thus an object of the present invention to provide a fastener which includes a shank for passing through a receiving structure including means for reliably delivering flowable sealant circumferentially around the shank, preferably into a circumferential channel, creating a circumferential seal between the shank and the receiving structure, thereby preventing flow of liquid along the shank and through the receiving structure.

It is another object of the present invention to provide such a fastener which may take any conventional form, such as a bolt, screw, rivet, pin or nail.

It is still another object of the present invention to provide such a fastener which is inserted into a receiving structure in the same way and with the same tool or tools used to insert an otherwise similar fastener, and through which a flowable sealant can be rapidly, easily and reliably delivered.

It is finally an object of the present invention to provide such a fastener which is relatively inexpensive to manufacture and to install in a receiving structure.

SUMMARY OF THE INVENTION

The present invention accomplishes the above-stated objectives, as well as others, as may be determined by a fair reading and interpretation of the entire specification.

A sealable fastener is provided for insertion into a fastener opening in a receiving structure, the sealable fastener including a fastener shank having a shank first end with a shank first end wall and a shank second end with a shank second end wall, a shank side wall extending between the shank first end wall and the shank second end wall, the shank first end additionally including a fastener head, and the fastener head including the shank first end wall; a circumferential channel in the shank side wall adjacent to the fastener head; and a sealant delivery passageway including a passageway entry port in the shank first end and extending through the fastener head and opening through a passageway exit port into the circumferential channel; so that flowable sealant injected into the passageway entry port flows through the sealant delivery passageway, out of the passageway exit port and into and around the circumferential channel, creating a circumferential seal between the fastener shank and the fastener opening in the receiving structure. The sealant delivery passageway optionally includes a bore in the fastener head. The sealant delivery passageway alternatively includes a notch in the fastener head.

A sealable fastener and fastener receiving structure is also provided, including a fastener receiving structure having a fastener opening for receiving a fastener; a fastener shank having a shank first end with a shank first end wall and a shank second end with a shank second end wall, a shank side wall extending between the shank first end wall and the shank second end wall, the shank first end additionally including a fastener head, and the fastener head including the shank first end wall; a circumferential channel in the shank side wall adjacent to the fastener head; and a sealant delivery passageway including a passageway entry port in the shank first end and extending through the fastener head and opening through a passageway exit port into the circumferential channel; so that flowable sealant injected into the passageway entry port flows through the sealant delivery passageway, out of the passageway exit port and into and around the circumferential channel, creating a circumferential seal between the fastener shank and the fastener opening in the receiving structure. The sealant delivery passageway optionally includes a bore in the fastener head.

A sealable fastener is further provided for insertion into a fastener opening in a receiving structure, the sealable fastener including a fastener shank having a shank first end with a shank first end wall and a shank second end with a shank second end wall, a shank side wall extending between the shank first end wall and the shank second end wall, the shank first end additionally including a fastener head, the fastener head including the shank first end wall; a first circumferential channel in the shank side wall adjacent to the fastener head; a second circumferential channel in the shank side wall between the first circumferential channel and the shank second end wall; a first sealant delivery passageway including a passageway entry port in the shank first end and extending through the fastener head and opening out of a passageway exit port into the first circumferential channel; and a second sealant delivery passageway including a groove in the shank side wall extending from the first circumferential channel to the second circumferential channel; so that flowable sealant injected into the delivery passageway flows through the first sealant delivery passageway into and around the first circumferential channel, creating a first circumferential seal between the fastener shank and the fastener opening in the receiving structure, and the flowable sealant flows from the first circumferential channel through the second sealant delivery passageway and flows into and around the second circumferential channel, creating a second circumferential seal between the fastener shank and the fastener opening in the receiving structure. The sealant delivery passageway optionally includes a notch in the fastener head. The first sealant delivery passageway alternatively includes a bore in the fastener head.

A sealable fastener is still further provided for insertion into a fastener opening in a receiving structure, the sealable fastener including a fastener shank having a shank first end with a shank first end wall and a shank second end with a shank second end wall, a shank side wall extending between the shank first end wall and the shank second end wall, the shank first end additionally including a fastener head, the fastener head including the shank first end wall; a first circumferential channel in the shank side wall adjacent to the fastener head; a second circumferential channel in the shank side wall between the first circumferential channel and the shank second end wall; a first sealant delivery passageway including a first passageway entry port in the shank first end and extending through the fastener head and opening out of a first passageway exit port into the first circumferential channel and out of a second passageway exit port into the second circumferential channel; so that flowable sealant injected into the first passageway entry port flows through the first sealant delivery passageway in the fastener head out of the first passageway exit port and into and around the first circumferential channel, creating a first circumferential seal between the fastener shank and the fastener opening in the receiving structure, and the flowable sealant flows out of the second passageway exit port into and around the second circumferential channel, creating a second circumferential seal between the fastener shank and the fastener opening in the receiving structure.

A sealable fastener is still further provided for insertion into an opening bore in a receiving structure, the sealable fastener including a fastener shank including a shank first end having a shank first end wall and a shank second end having a shank second end wall, a shank side wall extend between the shank first end wall and the shank second end wall and a circumferential channel recessed into the shank side wall, and a sealant delivery passageway having a passageway entry port in the shank first end and extending to a passageway exit port opening into the circumferential channel; so that a flowable sealant is injectable into the passageway entry port, so that the sealant flows through the sealant delivery passageway and exits through the passageway exit port and flows into and around the circumferential channel, creating a circumferential seal between the fastener shank and the opening in the receiving structure. A seal confirmation passageway is preferably provided having a seal confirmation passageway entry port in the circumferential channel and extending to a seal confirmation passageway exit port in the shank first end.

The passageway entry port preferably opens into the shank first end wall and the passageway includes a passageway axial segment extending toward the shank second end wall to a point between the shank first end wall and the shank second end wall, and a passageway radial segment extending from the passageway axial segment to the exit port. The fastener first end preferably includes a fastener head having a head top surface, where the head top surface is the shank first end wall, and where the passageway entry port opens into the fastener head.

The circumferential channel optionally is located substantially midway between the shank first end wall and the shank second end wall. Where the shank side wall includes fastener threads, the circumferential channel preferably is deeper than the fastener threads. The sealable fastener preferably includes several exit ports opening into the circumferential channel, the exit ports being circumferentially spaced apart along the circumferential channel for enhancing the speed and evenness of distribution of sealant into the circumferential channel.

The sealable fastener optionally includes several circumferential channels. The sealable fastener optionally includes a first circumferential channel located substantially one third of the length of the shank from the shank first end wall and a second circumferential channel located substantially two thirds of the length of the shank from the shank first end wall. The sealable fastener alternatively includes a first circumferential channel substantially at the midpoint of the shank between the shank first end wall and the second shank end wall, a second circumferential channel substantially midway between the shank first end wall and the first circumferential channel and a third circumferential channel substantially midway between the shank second end wall and the first circumferential channel. The sealable fastener is optionally one of a bolt and a rivet.

BRIEF DESCRIPTION OF THE DRAWINGS

Various other objects, advantages, and features of the invention will become apparent to those skilled in the art from the following discussion taken in conjunction with the following drawings, in which:

FIG. 1 is a side view of a fastener according to the invention, in the form of either a boat hull screw or a concrete anchor bolt and having an axial sealant delivery passageway with longitudinal and radial passageway segments and having a single circumferential channel adjacent to the fastener head.

FIG. 2 is a cross-sectional side view of the fastener of FIG. 1.

FIG. 8 is a cross-sectional side view of the fastener of FIG. 7a.

FIG. 9 is a side view of a fastener substantially as in FIG. 5, except that the fastener head is a hex head and the fastener has a sealant delivery passageway extending through the fastener head from an entry port at the center of the fastener head and angling radially outwardly to an exit port opening into a single circumferential channel adjacent to the fastener head.

FIG. 10 is a cross-sectional side view of the fastener of FIG. 9.

FIG. 16 is a side view as in FIG. 12 of a triple channel embodiment of the fastener.

FIG. 17 is a cross-sectional side view of the fastener of FIG. 16, revealing the three sealant delivery passageways.

FIG. 18 is a cross-sectional side view of the open ended channel, extending from the passageway exit port to the fastener head.

FIG. 19 is a cross-sectional side view of the triple channel embodiment of the inventive fastener fit through bores in two abutting receiving structures, showing flowable sealant being injected by the nozzle of an adhesive gun and circumferentially filling the three channels to create a triple seal.

FIG. 20 is a cross-sectional side view of the open ended channel embodiment of the inventive fastener fit through bores in two abutting receiving structures, showing flowable sealant being injected by the nozzle of an adhesive gun and circumferentially filling the open ended channel to create a seal.

FIG. 21 is a lateral cross-section of the fastener shank across a circumferential channel showing the axial passageway segment and a single radial passageway segment. FIG. 21a is a lateral cross-section of the fastener shank across a circumferential channel showing the axial passageway segment and a two radial passageway segments. FIG. 21b is a lateral cross-section as in FIG. 21a showing the axial passageway segment, but a three radial passageway segments.

FIG. 22 is a side view of a rivet equipped with the sealant channel and delivery passageway of the present invention, shown in broken lines.

DETAILED DESCRIPTION OF THE PREFERRED EMBODIMENTS

Figure 3:
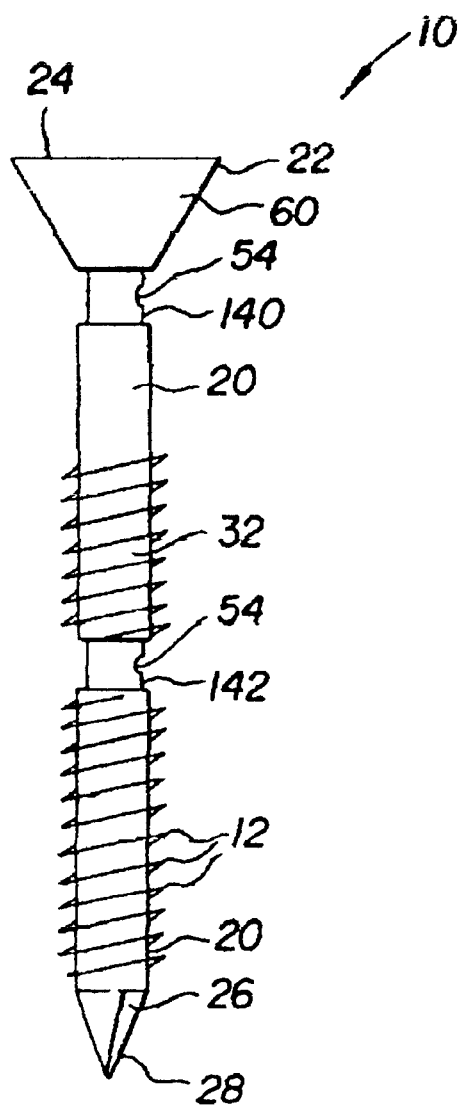
FIG. 3 is a side view of a fastener as in FIG. 1, with a second circumferential channel added at the fastener shank middle region.
Figure 4:
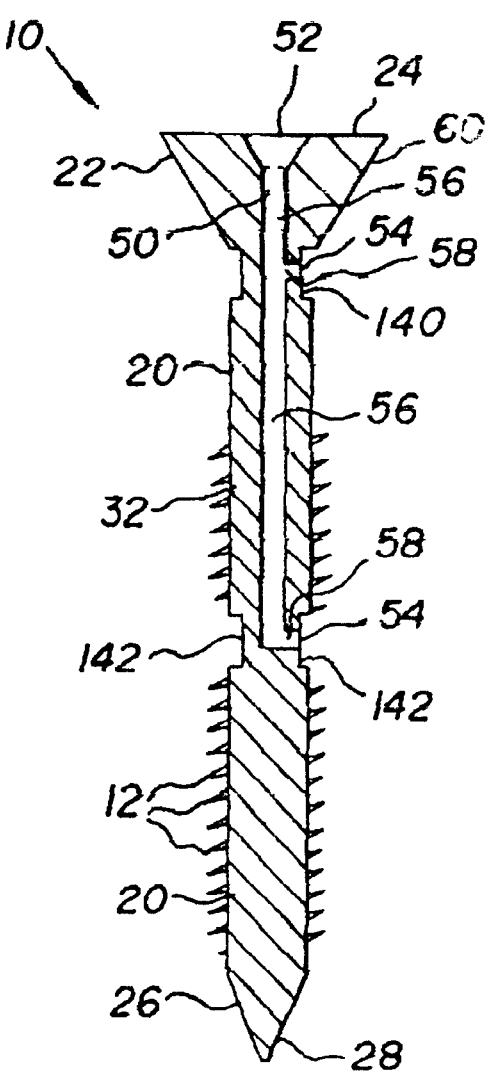
FIG. 4 is a cross-sectional side view of the fastener of FIG. 3.
Figure 7:
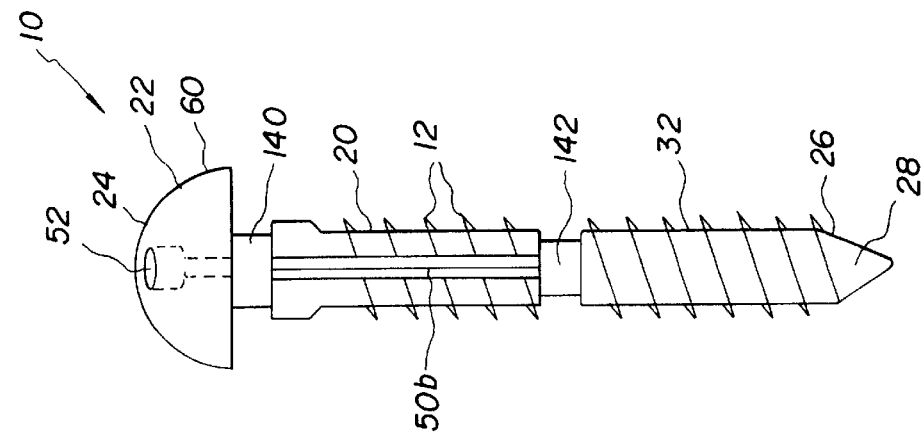
FIG. 7 is a side view of a fastener as in FIG. 5, with a sealant delivery passageway segment in the form of a longitudinal groove in the shank side wall leading to a second circumferential channel added at the fastener shank middle region. In this FIGURE the fastener is oriented so that the longitudinal groove is directly toward the viewer, and the first sealant delivery passageway passing through the fastener head is shown in broken lines.
Figure 6:
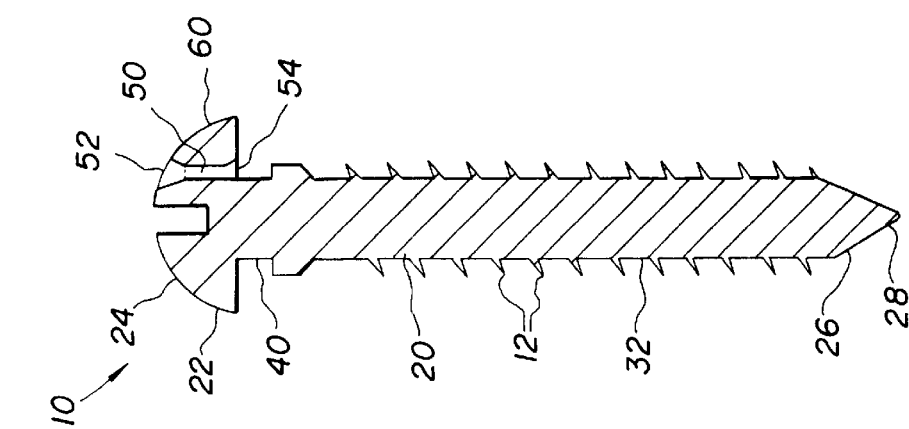
FIG. 6 is a cross-sectional side view of the fastener of FIG. 5.
Figure 5:
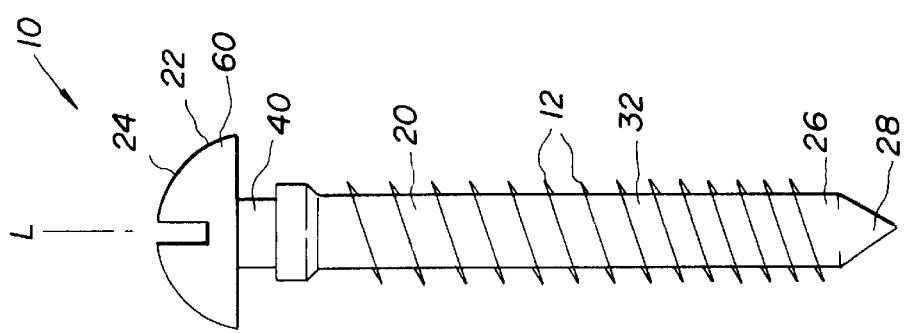
FIG. 5 is a side view of a fastener according to the invention, in the form of a boat hull screw and having a sealant delivery passageway extending through the fastener head parallel to and spaced laterally from the shank longitudinal axis and having a single circumferential channel adjacent to the fastener head.
Figure 7A:
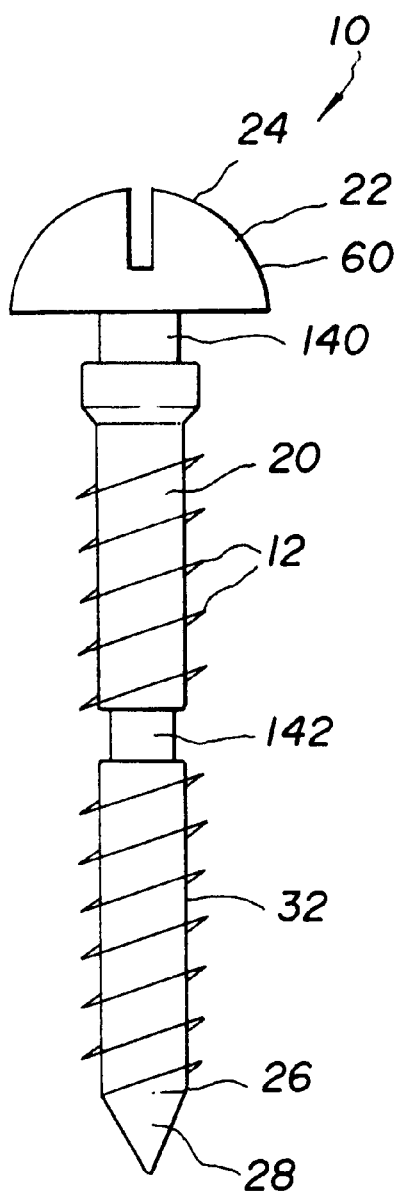
FIG. 7a is another side view of the fastener of FIG. 7, with the fastener oriented so that the longitudinal groove opens to the right in the FIGURE.

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Reference is now made to the drawings, wherein like characteristics and features of the present invention shown in the various FIGURES are designated by the same reference numerals.

First Preferred Embodiment

Referring to FIGS. 1–23, a sealable fastener 10 is disclosed including a fastener shank 20 having a shank first end 22 with a shank first end wall 24 and a shank second end 26 with a shank second end wall 28, a shank side wall 32 extending between shank first end 22 and shank second end 26, a continuous, fully circumferential channel 40 recessed into shank side wall 32, and including a sealant delivery passageway 50 having a passageway entry port 52 in the shank first end 22 and extending both longitudinally and laterally to a passageway exit port 54 opening into circumferential channel 40.

The sealant delivery passageway 50 may be a bore in fastener shank 20 extending from entry port 52 substantially coaxially with or substantially parallel to the shank longitudinal axis L opening through exit port 54 into circumferential channel 40 or optionally opening through two separate exit ports 54 into first and second circumferential channels 140 and 142, respectively. In the latter instance, passageway 50 preferably includes passageway axial and radial segments 56 and 58, respectively, as illustrated. Examples are shown in FIGS. 1–4 in the form of boat hull screws or concrete anchor bolts. Alternatively, a first sealant delivery passageway segment 50a is provided including a fastener head bore extending from entry port 52 through the fastener head 60 opening through exit port 54 into a single circumferential channel 40 or into a first circumferential channel 140 and including a second sealant delivery passageway segment 50b in the form of a groove in the shank side wall 32 extending from first circumferential channel 140 substantially parallel to the shank longitudinal axis L, and opening into second circumferential 142. Examples are shown in FIGS. 5–10 in the form of boat hull screws. The first sealant delivery passageway 50a alternatively is a notch in the side of the fastener head 60 extending from shank first end wall 24 to circumferential channel 40 or to first circumferential channel 140. See FIG. 11. The fastener head bore 50a preferably opens at the passageway entry port 52 at or near the center of fastener head 60 and angles outwardly from the shank longitudinal axis L as bore 50a advances toward shank second end 26 to open into a circumferential channel 40 or a first circumferential channel 140 immediately below the fastener head 60. See FIG. 10. Alternatively first sealant delivery passageway segment 50a is positioned off-center from and substantially parallel to shank longitudinal axis L. See FIGS. 6 and 8. Still alternatively, the first sealant delivery passageway 50a is a bore extending through and beyond fastener head 60 into the fastener shank 20.

When fastener 10 is to be used, the fastener shank 20 is inserted into a fastener opening such as a fastener bore B in a receiving structure R such as a boat hull or a nut N. Then a flowable sealant S is injected into entry port 52 so that the sealant S flows through sealant delivery passageway 50 and exits through exit port 54 and flows into and around circumferential channel 40, creating a circumferential seal between fastener shank 20 and the receiving structure R so that water or other liquid cannot flow around the fastener shank 20 and through the receiving structure R. Sealant S injection is preferably preformed by an adhesive dispensing gun G, structured much like a conventional caulking gun, examples of which are found in the existing art.

Figure 8:
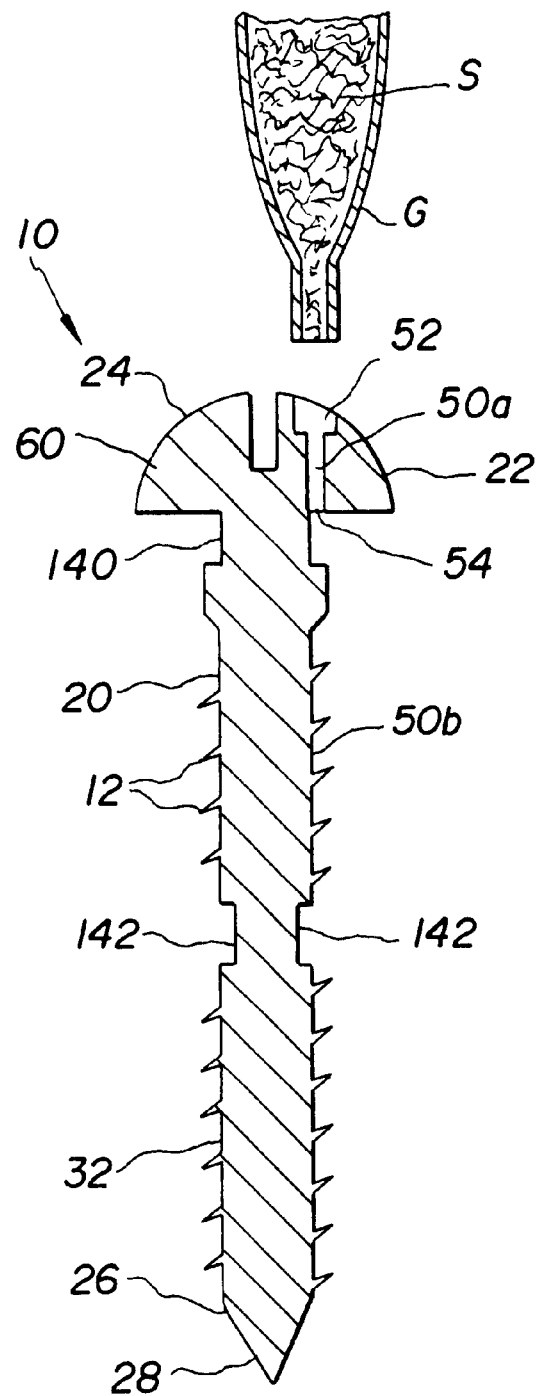
Figure 11:
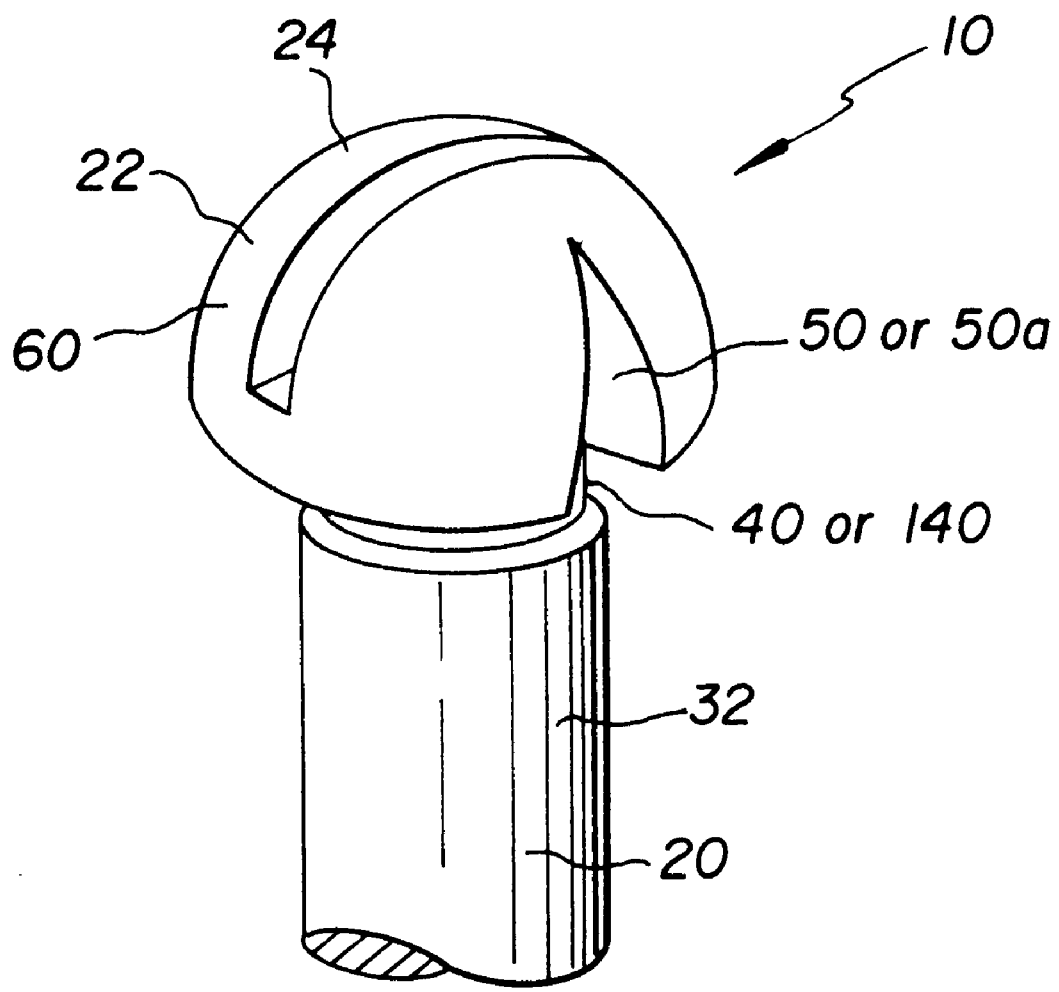
FIG. 11 is a perspective view of a broken away fastener head having the sealant delivery passageway or first sealant delivery passageway segment in the form of a notch in the fastener head, opening into the circumferential channel or into the first circumferential channel.
Figure 12:
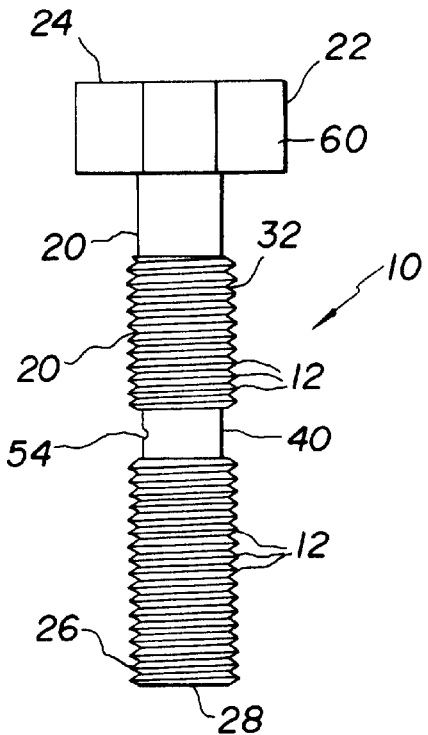
FIG. 12 is a side view of a fastener having the sealant channel and delivery passageway of the present invention.
Figure 13:
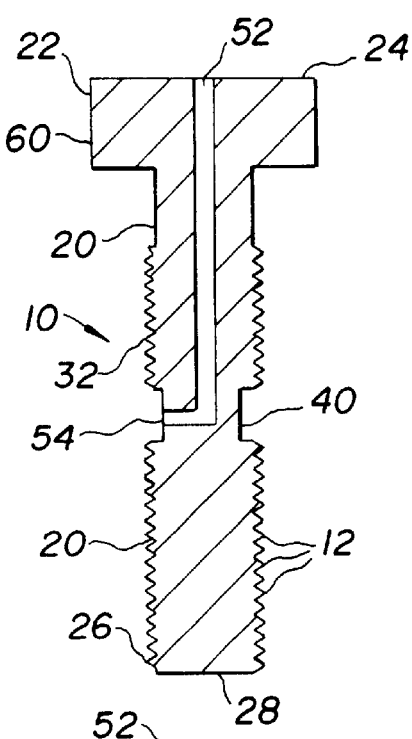
FIG. 13 is a cross-sectional side view of the fastener of FIG. 12, revealing the sealant delivery passageway.
Figure 14:
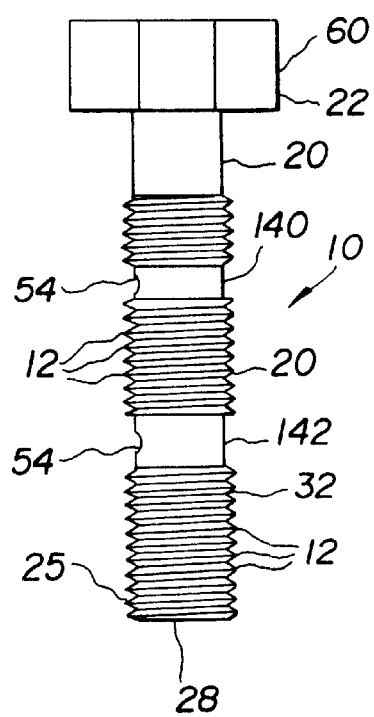
FIG. 14 is a side view as in FIG. 12 of a double channel embodiment of the fastener.
Figure 15:
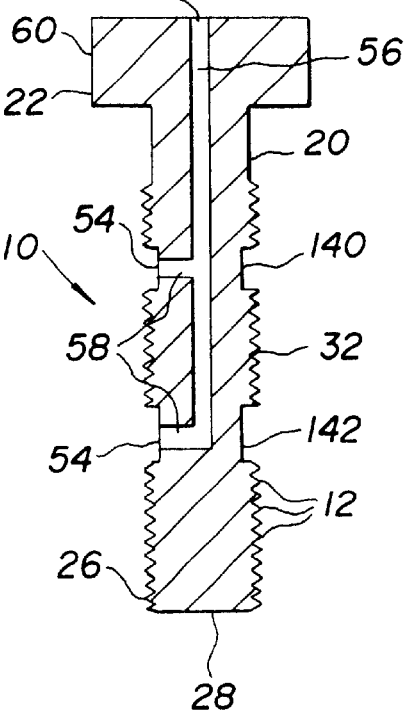
FIG. 15 is a cross-sectional side view of the fastener of FIG. 14, revealing the two sealant delivery passageways.
Figure 23:
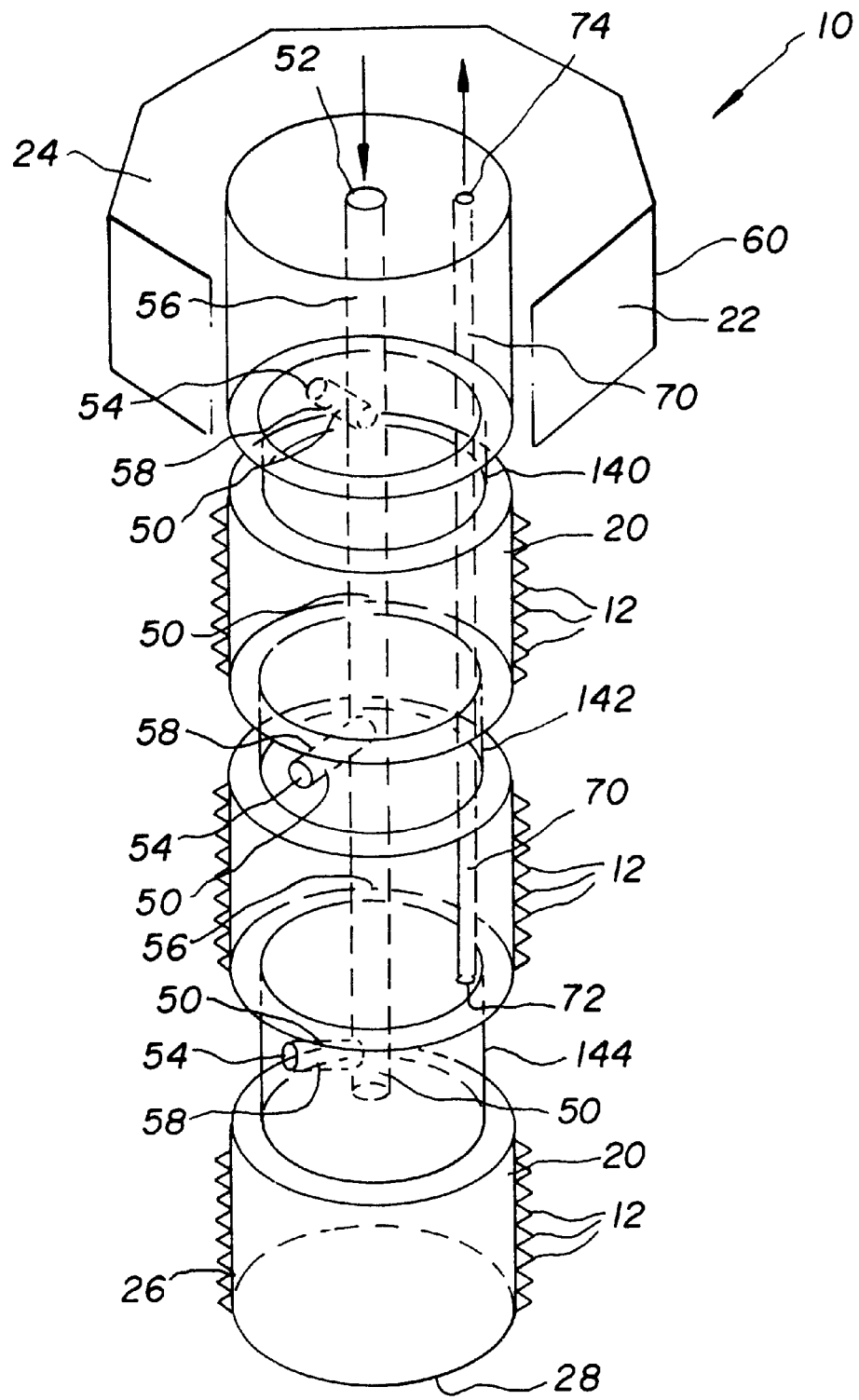
FIG. 23 is a transparent, perspective view of a bolt equipped with three sealant delivery passageways and showing the preferred seal confirmation passageway opening out of the most distal, third sealant delivery passageway opposite its passageway radial segment and extending generally axially within the shank to open out of the head of the bolt. Sealant pumped into the third sealant delivery passageway flows into the seal confirmation passageway until the sealant begins to escape through the delivery passageway exit port in the shank first end to indicate that all circumferential channels are filled with sealant and all three form a circumferential seal around the bolt shank.

Entry port 52 preferably opens into the shank first end wall 24 and the passageway 50 preferably includes a passageway axial segment 56 extending directly toward the shank second end wall 28 to a point between shank first end wall 24 and second end wall 28, and a passageway radial segment 58 which extends from passageway axial segment 56 to exit port 54, once again opening into circumferential channel 40. As indicated above, the fastener first end 22 preferably includes a fastener head 60, the top of which is the shank first end wall 24, and the passageway entry port 52 preferably opens into the fastener head 60. Circumferential channel 40 preferably is located either immediately adjacent to the fastener head 60 or midway between the shank first and second end walls 24 and 28, respectively, but can be located at virtually any point along shank 20 accessible by passageway 50. Fastener head 60 optionally forms a side of circumferential channel 40 or of first circumferential channel 140, as illustrated. Various channel 40 widths and depths may be provided, depending upon the type of sealant S used and upon the durability of sealing required for the specific application. Circumferential channel 40 is preferably deeper than any fastener threads 12 on the shank 20. Channel 40 optionally follows an irregular or skewed path around the shank 20. Several circumferentially spaced apart exit ports 54 optionally open into the circumferential channel 40 for more rapid and even distribution of sealant S into channel 40. See FIGS. 21–21b. The entry port 52 leading into sealant delivery passageway 50 or into first sealant delivery passageway segment 50 preferably is wider than the passageway 50 or passageway segment 50a at the shank first end 22 outer surface and narrows to the diameter of the passageway 50 or passageway segment 50a as it advances into shank first end 22, so that a sealant injection tool such as an adhesive dispensing gun G can more easily inject sealant or adhesive into the entry port 52. Sealant delivery passageway 50 or passageway segment 50a alternatively is countersunk with a wider bore at entry port 52 as shown in FIG. 8 to snugly receive a tip of a nozzle of a sealant or adhesive dispensing gun G, to constrain the sealant S to flow into sealant delivery passageway 50 to resist sealant S leakage.

Examples of flowable sealants are, but are not limited to, FUSOR SELF-LEVELING SEAM SEALER™, company reference number 122EZ, and LORD™ Urethane Adhesive, company reference numbers 7542A/B and 7545A/B. Fastener 10 is preferably configured as a bolt, but also may be configured as a screw, a pin, or a nail or a rivet (see FIG. 22). While virtually all existing fasteners are circular in cross-section, this sealant S delivery feature is understood to be suited for incorporation into fasteners of other cross-sectional shapes, and thus the term "fastener" is understood to include fasteners of all cross-sectional shapes.

As mentioned above, several circumferential channels are optionally provided on a given fastener 10. A double channel embodiment includes a first circumferential channel 140 located substantially one third of the shank 20 length from the shank first end wall 24 and a second circumferential channel 142 located substantially two thirds of the shank 20 length from the shank first end wall 24. See FIGS. 14 and 15. It is preferred that the second passageway radial segment 58 be wider than first passageway radial segment 58 and that second circumferential channel 142 be wider than first circumferential channel 140.

A triple channel embodiment includes a first circumferential channel 140 substantially at the shank 20 midpoint between shank first end wall 24 and shank second end wall 28, a second circumferential channel 142 substantially midway between shank first end wall 24 and first circumferential channel 140 and a third circumferential channel 144 substantially midway between the shank second end wall 28 and first circumferential channel 140. See FIGS. 16 and 17. Still more circumferential channels may be provided as desired for a given application. Once again, it is preferred that the second passageway radial segment 58 be wider than the first passageway radial segment 58 and that the second circumferential channel 142 be wider than first circumferential channel 140, and it is further preferred that the third passageway radial segment be wider than the first passageway radial segment 58 and that third circumferential channel 144 be wider than second circumferential channel 142. The reason for these distally progressive increments in passageway radial segment 58 diameters is that sealant S pressure diminishes as it flows distally, and a wider passageway radial segment 58 helps compensate for this loss in sealant S pressure.

As mentioned above, and illustrated in FIGS. 1–7a, generally, another embodiment has an open end channel 240 which extends from exit port 54 either to the fastener head 60 or to the shank second end 26. See additional examples in FIGS. 18 and 19. The depth of open end channel 240 is either equal to and preferably greater than the depth of the troughs of threads 12.

A seal confirmation passageway 70 is preferably provided for indicating when the circumferential channel 40 is filled with sealant S and forms a circumferential seal around the bolt shank 20. A seal confirmation passageway entry port 72 opens out of circumferential channel 40 into seal confirmation passageway 70 which extends generally axially through shank 20 to a seal confirmation passageway exit port 74 in shank first end 22. Seal confirmation passageway entry port 72 preferably opens out of circumferential channel 40 opposite passageway radial segment 58 so that sealant S only enters passageway 70 after flowing all the way around circumferential channel 40 and creating a complete seal. Where multiple circumferential channels 140, 142 and 144 are provided, seal confirmation passageway entry port 72 opens out of the most distal channel 144, which is preferably a deeper channel than channels 140 and 142 so that seal confirmation passageway 70 can extend substantially parallel to the shank axis and yet not intersect or enter channels 140 and 142. See FIG. 23. Since sealant S reaches circumferential channel 140 first, reaches circumferential channel 142 second and only then reaches circumferential channel 144 third, the discharge of sealant S through passageway 70 indicating that third circumferential channel 144 is filled also indicates that sealant S has filled circumferential channels 140 and 142 as well. It is noted that a seal confirmation passageway 70 may be provided for any of the fasteners 10 illustrated in the attached FIGURES.

While the invention has been described, disclosed, illustrated and shown in various terms or certain embodiments or modifications which it has assumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. A sealable fastener for insertion into a fastener opening in a receiving structure, the sealable fastener comprising:
    a fastener shank comprising a shank first end having a shank first end wall and a shank second end having a shank second end wall, a shank side wall between said shank first end wall and said shank second end wall, said shank first end additionally comprising a fastener head, and said fastener head comprising said shank first end wall;
    a circumferential channel in said shank side wall;
    a fastener thread in said shank side wall located between said shank first end and said circumferential channel, and located between said circumferential channel and said shank second end;
    and a sealant delivery passageway having a passageway entry port in said shank first end and a passageway exit port opening into said circumferential channel and extending from said passageway entry port through said fastener head to said passageway exit port;
    such that flowable sealant injected into said passageway entry port flows through said sealant delivery passageway, out of said passageway exit port and into and around said circumferential channel, creating a circumferential seal between said fastener shank and the fastener opening in the receiving structure.

2. The sealable fastener of claim 1, wherein said sealant delivery passageway comprises a bore in said fastener head.

3. The sealable fastener of claim 1, wherein said sealant delivery passageway comprises a notch in said fastener head.

4. A sealable fastener and fastener receiving structure, comprising:
    a fastener receiving structure having a fastener opening with a fastener opening interior surface;
    a sealable fastener comprising a fastener shank with a shank first end having a shank first end wall and a shank second end having a shank second end wall, a shank side wall between said shank first end wall and said shank second end wall, said shank first end additionally comprising a fastener head, and said fastener head comprising said shank first end wall, said shank side wall comprising a circumferential channel and comprising a fastener thread located between said shank first end and said circumferential channel and located between said circumferential channel and said shank second end, said fastener shank extending into said fastener opening such that said shank second end is contained within said fastener opening, said shank being sized in diameter such that said fastener thread engages said fastener opening interior surface; and a sealant delivery passageway having a passageway entry port in said shank first end and a passageway exit port opening into said circumferential channel and extending from said passageway entry port through said fastener head to said passageway exit port;
    and a quantity of flowable sealant extending substantially from said passageway entry port through said sealant delivery passageway, out of said passageway exit port and into and around said circumferential channel and into sealing contact with said fastener opening interior surface, such that said flowable sealant creates a circumferential seal between said fastener shank and said fastener opening in said fastener receiving structure.

5. The sealable fastener and fastener receiving structure of claim 4, wherein said sealant delivery passageway comprises a bore in said fastener head.

6. The sealable fastener and fastener receiving structure of claim 4, wherein said sealant comprises an adhesive.

7. A sealable fastener for insertion into a fastener opening in a receiving structure, the sealable fastener comprising:
    a fastener shank comprising a shank first end having a shank first end wall and a shank second end having a shank second end wall, a shank side wall between said shank first end wall and said shank second end wall and having a fastener thread, said shank first end additionally comprising a fastener head, said fastener head comprising said shank first end wall;
    a first circumferential channel in said shank side wall adjacent to said fastener head;
    a second circumferential channel in said shank side wall between said first circumferential channel and said shank second end wall;
    a first sealant delivery passageway having a passageway entry port in said shank first end and a passageway exit port opening into said first circumferential channel and extending from said passageway entry port through said fastener head to said passageway exit port;
    and a second sealant delivery passageway comprising a groove in said shank side wall extending from said first circumferential channel to said second circumferential channel;
    such that flowable sealant injected into said delivery passageway flows through said first sealant delivery passageway into and around said first circumferential channel, creating a first circumferential seal between said fastener shank and the fastener opening in the receiving structure, and the flowable sealant flows from said first circumferential channel through said second sealant delivery passageway and flows into and around said second circumferential channel, creating a second circumferential seal between said fastener shank and the fastener opening in the receiving structure.

8. The sealable fastener of claim 7, wherein said sealant delivery passageway comprises a notch in said fastener head.

9. The sealable fastener of claim 7, wherein said first sealant delivery passageway comprises a bore in said fastener head.

10. A sealable fastener for insertion into a fastener opening in a receiving structure, the sealable fastener comprising:
- a fastener shank comprising a shank first end having a shank first end wall and a shank second end having a shank second end wall, a shank side wall between said shank first end wall and said shank second end wall and having a fastener thread, said shank first end additionally comprising a fastener head, said fastener head comprising said shank first end wall;
- a first circumferential channel in said shank side wall adjacent to said fastener head;
- a second circumferential channel in said shank side wall between said first circumferential channel and said shank second end wall;
- and a first sealant delivery passageway having a first passageway entry port in said shank first end and having a first passageway exit port opening into said first circumferential channel and a second passageway exit port opening into said second circumferential channel and extending from said first passageway entry port through said fastener head to said first passageway exit port and to said second passageway exit port;
- such that flowable sealant injected into said first passageway entry port flows through said first sealant delivery passageway in said fastener head out of said first passageway exit port and into and around said first circumferential channel, creating a first circumferential seal between said fastener shank and the fastener opening in the receiving structure, and the flowable sealant flows out of said second passageway exit port into and around said second circumferential channel, creating a second circumferential seal between said fastener shank and the fastener opening in the receiving structure.

11. A sealable fastener and fastener receiving structure, comprising:
- a fastener receiving structure having a fastener opening with a fastener opening interior surface;
- a sealable fastener comprising a fastener shank with a shank first end having a shank first end wall and a shank second end having a shank second end wall, a shank side wall between said shank first end wall and said shank second end wall, said shank side wall comprising a circumferential channel and comprising a fastener thread located between said shank first end and said circumferential channel and located between said circumferential channel and said shank second end; and a sealant delivery passageway having a passageway entry port in said shank first end and a passageway exit port opening into said circumferential channel and extending from said passageway entry port to said passageway exit port;
- said fastener shank extending into said fastener opening such that said shank second end is contained within said fastener opening, said shank second end being sized in diameter such that said fastener thread engages said fastener opening interior surface;
- and a quantity of flowable sealant extending substantially from said passageway entry port through said sealant delivery passageway, out of said passageway exit port and into and around said circumferential channel and into sealing contact with said fastener opening interior surface, such that said flowable sealant creates a circumferential seal between said fastener shank and said fastener opening in said fastener receiving structure.

12. The sealable fastener and fastener receiving structure of claim 11, wherein said delivery passageway entry port opens into said shank first end wall and said delivery passageway comprises a delivery passageway axial segment extending toward said shank second end wall to a point between said shank first end wall and said shank second end wall, and a delivery passageway radial segment extending from said delivery passageway axial segment to said exit port.

13. The sealable fastener and fastener receiving structure of claim 11, wherein said fastener first end comprises a fastener head having a head top surface, and wherein the head top surface is said shank first end wall, and wherein said passageway entry port opens into said fastener head.

14. The sealable fastener and fastener receiving structure of claim 11, wherein said circumferential channel is located substantially midway between said shank first end wall and said shank second end wall.

15. The sealable fastener and fastener receiving structure of claim 11, comprising a plurality of delivery passageway exit ports opening into said circumferential channel, said delivery passageway exit ports being circumferentially spaced apart along said circumferential channel for enhancing the speed and evenness of distribution of sealant into said circumferential channel.

16. The sealable fastener and fastener receiving structure of claim 11, wherein said sealant comprises an adhesive.

17. A sealable fastener for insertion into a fastener opening in a receiving structure, the sealable fastener comprising:
- a fastener shank comprising a shank first end having a shank first end wall and a shank second end having a shank second end wall, a shank side wall between said shank first end wall and said shank second end wall and having a fastener thread, said shank first end additionally comprising a fastener head, and said fastener head comprising said shank first end wall;
- a circumferential channel in said shank side wall adjacent to said fastener head;
- and a sealant delivery passageway having a passageway entry port in said shank first end and a passageway exit port opening into said circumferential channel and extending from said passageway entry port through said fastener head to said passageway exit port;
- such that flowable sealant injected into said passageway entry port flows through said sealant delivery passageway, out of said passageway exit port and into and around said circumferential channel, creating a circumferential seal between said fastener shank and the fastener opening in the receiving structure;
- wherein said shank side wall comprises a plurality of circumferential channels.

18. The sealable fastener of claim 17, comprising a first said circumferential channel located substantially one third of the length of said shank from said shank first end wall and a second said circumferential channel located substantially two thirds of the length of said shank from said shank first end wall.

19. The sealable fastener of claim 17, comprising a first circumferential channel substantially at the midpoint of said shank between said shank first end wall and said shank second end wall, a second circumferential channel substantially midway between said shank first end wall and said first circumferential channel and a third circumferential channel substantially midway between said shank second end wall and said first circumferential channel.

20. A sealable fastener for insertion into a fastener opening in a receiving structure, the sealable fastener comprising:
- a fastener shank comprising a shank first end having a shank first end wall and a shank second end having a shank second end wall, a shank side wall between said shank first end wall and said shank second end wall and having a fastener thread, said shank first end additionally comprising a fastener head, and said fastener head comprising said shank first end wall;

a first circumferential channel in said shank side wall adjacent to said fastener head;

a second circumferential channel in said shank side wall spaced apart from said first circumferential channel, said shank side wall comprising shank side wall a fastener thread between said first circumferential channel and said second circumferential channel;

and a sealant delivery passageway having a first passageway entry port in said shank first end and having a first passageway exit port opening into said first circumferential channel and a second passageway exit port opening into said second circumferential channel and extending from said first passageway entry port through said fastener head to said first passageway exit port and to said second passageway exit port;

such that flowable sealant injected into said passageway entry port flows through said sealant delivery passageway, out of said first passageway exit port and into and around said first circumferential channel and out of said second passageway exit port and into and around said second circumferential channel, creating circumferential seals between said fastener shank and the fastener opening in the receiving structure.

21. A sealable fastener for insertion into a fastener opening in a receiving structure, the sealable fastener comprising:

a fastener shank comprising a shank first end having a shank first end wall and a shank second end having a shank second end wall, a shank side wall between said shank first end wall and said shank second end wall and a first circumferential channel in said shank side wall and a second circumferential channel in said shank side wall, said shank side wall comprising a fastener thread between said first circumferential channel and said second circumferential channel;

and a sealant delivery passageway having a delivery passageway entry port in said shank first end and having a delivery passageway first exit port opening into said first circumferential channel and a delivery passageway second exit port opening into said second circumferential channel and extending from said first passageway entry port to said first passageway exit port and to said second passageway exit port;

such that a flowable sealant is injectable into said delivery passageway entry port after the fastener shank is inserted into the fastener opening, and such that the flowable sealant flows through said sealant delivery passageway and exits through said delivery passageway first exit port and flows into and around said first circumferential channel and exits through said delivery passageway second exit port and flows into and around said second circumferential channel, creating first and second circumferential seals between said fastener shank and the fastener opening in the receiving structure.

22. A sealable fastener and fastener receiving structure, comprising:

a fastener receiving structure having a fastener opening with fastener opening interior surface;

a fastener shank comprising a shank first end having a shank first end wall and a shank second end having a shank second end wall, a shank side wall between said shank first end wall and said shank second end wall and a first circumferential channel in said shank side wall and a second circumferential channel in said shank side wall, said shank side wall comprising a fastener thread between said first circumferential channel and said second circumferential channel, said fastener shank extending into said fastener opening such that said shank second end is contained within said fastener opening, said fastener shank being sized in diameter such that said fastener thread engages said fastener opening interior surface;

and a sealant delivery passageway having a delivery passageway entry port in said shank first end and having a delivery passageway first exit port opening into said first circumferential channel and a delivery passageway second exit port opening into said second circumferential channel and extending from said first passageway entry port to said first passageway exit port and to said second passageway exit port;

such that a flowable sealant is injectable into said delivery passageway entry port after the fastener shank is inserted into the fastener opening, and such that the flowable sealant flows through said sealant delivery passageway and exits through said delivery passageway first exit port and flows into and around said first circumferential channel and exits through said delivery passageway second exit port and flows into and around said second circumferential channel, creating first and second circumferential seals between said fastener shank and the fastener opening in the receiving structure.

* * * * *